United States Patent
Duan et al.

(10) Patent No.: US 7,926,146 B2
(45) Date of Patent: Apr. 19, 2011

(54) HINGE ASSEMBLY FOR FOLDABLE ELECTRONIC DEVICES

(75) Inventors: Chao Duan, Shenzhen (CN); Chia-Hua Chen, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 319 days.

(21) Appl. No.: 12/194,613

(22) Filed: Aug. 20, 2008

(65) Prior Publication Data
US 2009/0223020 A1    Sep. 10, 2009

(30) Foreign Application Priority Data
Mar. 10, 2008 (CN) .......................... 2008 2 0300321

(51) Int. Cl.
*E05F 1/08* (2006.01)
(52) U.S. Cl. .......................................... 16/303; 16/330
(58) Field of Classification Search .................. 16/330, 16/303, 337–339, 386; 379/433.12, 433.13; 361/679.08, 679.12, 679.15, 679.27; 455/575.8; 348/333.01, 333.06, 373, 794
See application file for complete search history.

(56) References Cited

U.S. PATENT DOCUMENTS

| | | | | |
|---|---|---|---|---|
| 6,568,032 | B1 * | 5/2003 | Ramsauer | 16/329 |
| 6,766,180 | B2 * | 7/2004 | Doraiswamy et al. | 455/575.1 |
| 7,062,817 | B2 * | 6/2006 | Lee | 16/334 |
| 7,672,451 | B2 * | 3/2010 | Cheon | 379/433.13 |
| 7,707,688 | B2 * | 5/2010 | Ishikawa et al. | 16/303 |
| 7,747,005 | B2 * | 6/2010 | Konja et al. | 379/433.13 |
| 2005/0138771 | A1 * | 6/2005 | Su | 16/330 |
| 2006/0032020 | A1 * | 2/2006 | Duan et al. | 16/288 |
| 2006/0254026 | A1 * | 11/2006 | Duan et al. | 16/330 |
| 2007/0011847 | A1 * | 1/2007 | Luo | 16/303 |
| 2007/0245523 | A1 * | 10/2007 | Yang | 16/330 |
| 2007/0271734 | A1 | 11/2007 | Ishikawa et al. | |
| 2009/0064462 | A1 * | 3/2009 | Yin et al. | 16/330 |
| 2009/0100641 | A1 * | 4/2009 | Yang | 16/303 |

FOREIGN PATENT DOCUMENTS
KR    2004055333 A  *  6/2004
* cited by examiner

*Primary Examiner* — Chuck Y. Mah
(74) *Attorney, Agent, or Firm* — Steven M. Reiss

(57) ABSTRACT

A hinge assembly (100) includes a sleeve (20), a main shaft (10), a follower (30) and an elastic member (40). The sleeve integrally forms an engaging portion (26). The main shaft passes through the sleeve. The follower has a cam surface (322), and is slidably placed around the main shaft and is received in the sleeve. The cam surface engages with the engaging portion. The elastic member provides an elastic force to bias the cam surface against the engaging portion.

10 Claims, 11 Drawing Sheets

HINGE ASSEMBLY FOR FOLDABLE ELECTRONIC DEVICES

BACKGROUND

1. Field of the Invention

The present invention relates to hinge assemblies and, particularly, to hinge assemblies for foldable electronic devices, such as mobile phones and portable computers.

2. Description of Related Art

Presently, the most popular electronic device in the marketplace is the foldable mobile phone, which generally includes a cover section and a body section. The cover section and the body section are rotatably connected to each other using a hinge assembly, for switching the mobile phone between an in-use position and a closed position.

Most hinge assemblies are made up of different followers and cams. However, any follower and cam need to form connecting structures to fix a hinge with respect to the cover section and the body section. The above connecting structures complicate the process of making the cam and the follower. In addition, this assembly method is time consuming.

Therefore, there is room for improvement within the art.

BRIEF DESCRIPTION OF THE DRAWINGS

Many aspects of the present hinge assembly can be better understood with reference to the following drawings. The components in the drawings are not necessarily drawn to scale, the emphasis instead being placed upon clearly illustrating the principles of the present hinge assembly. Moreover, in the drawings, like reference numerals designate corresponding parts throughout the several views, in which.

DETAILED DESCRIPTION OF THE EMBODIMENTS

The present hinge assembly is suitable for a foldable electronic device such as a flip-type mobile phone, for pivotably coupling a cover section to a body section. It is to be understood, however, that the hinge assembly could be advantageously used in other diverse environments (e.g. cabinet doors).

Figure 1:
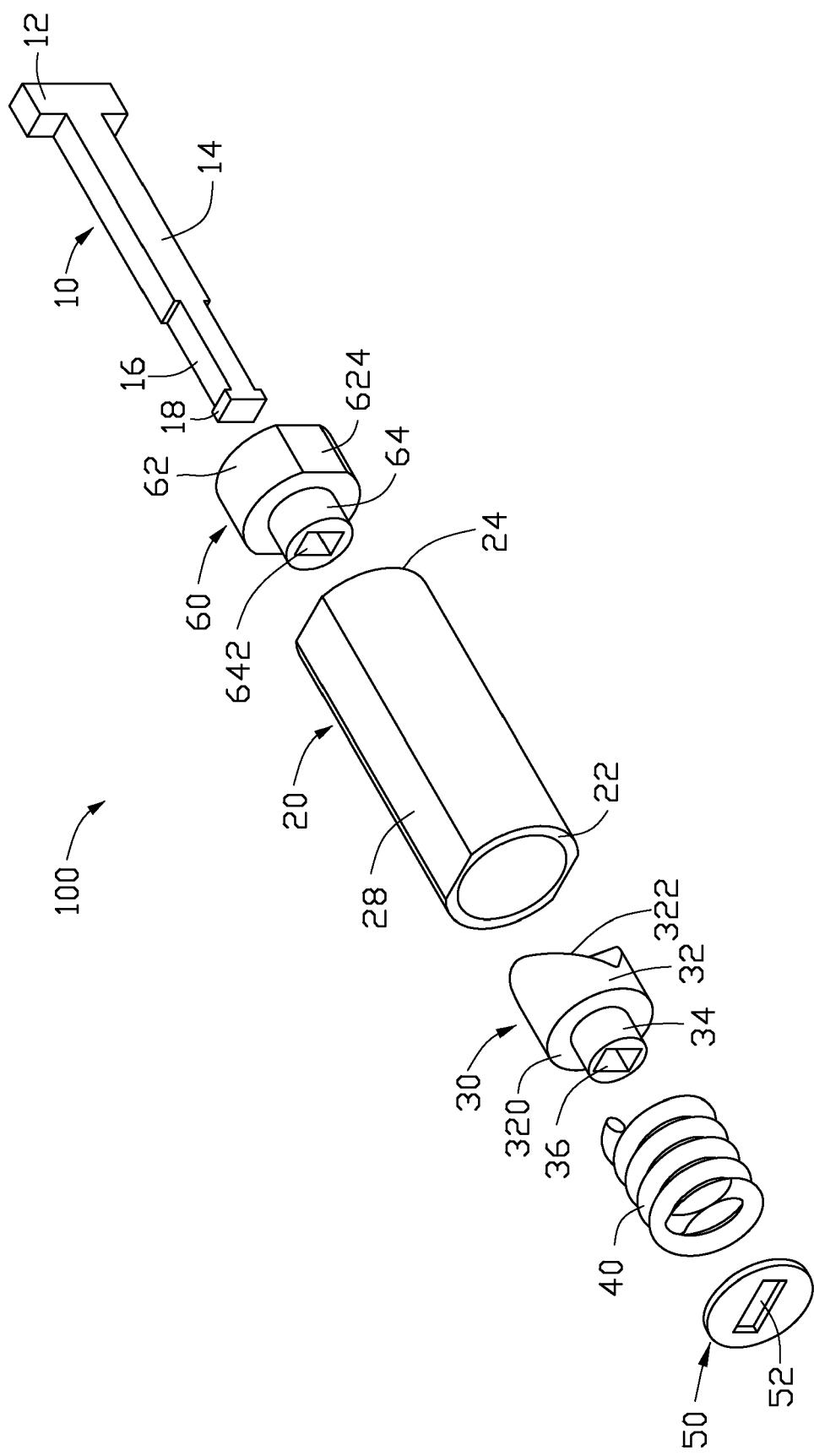
FIG. 1 is an exploded, isometric view of a first exemplary hinge assembly.
Figure 2:
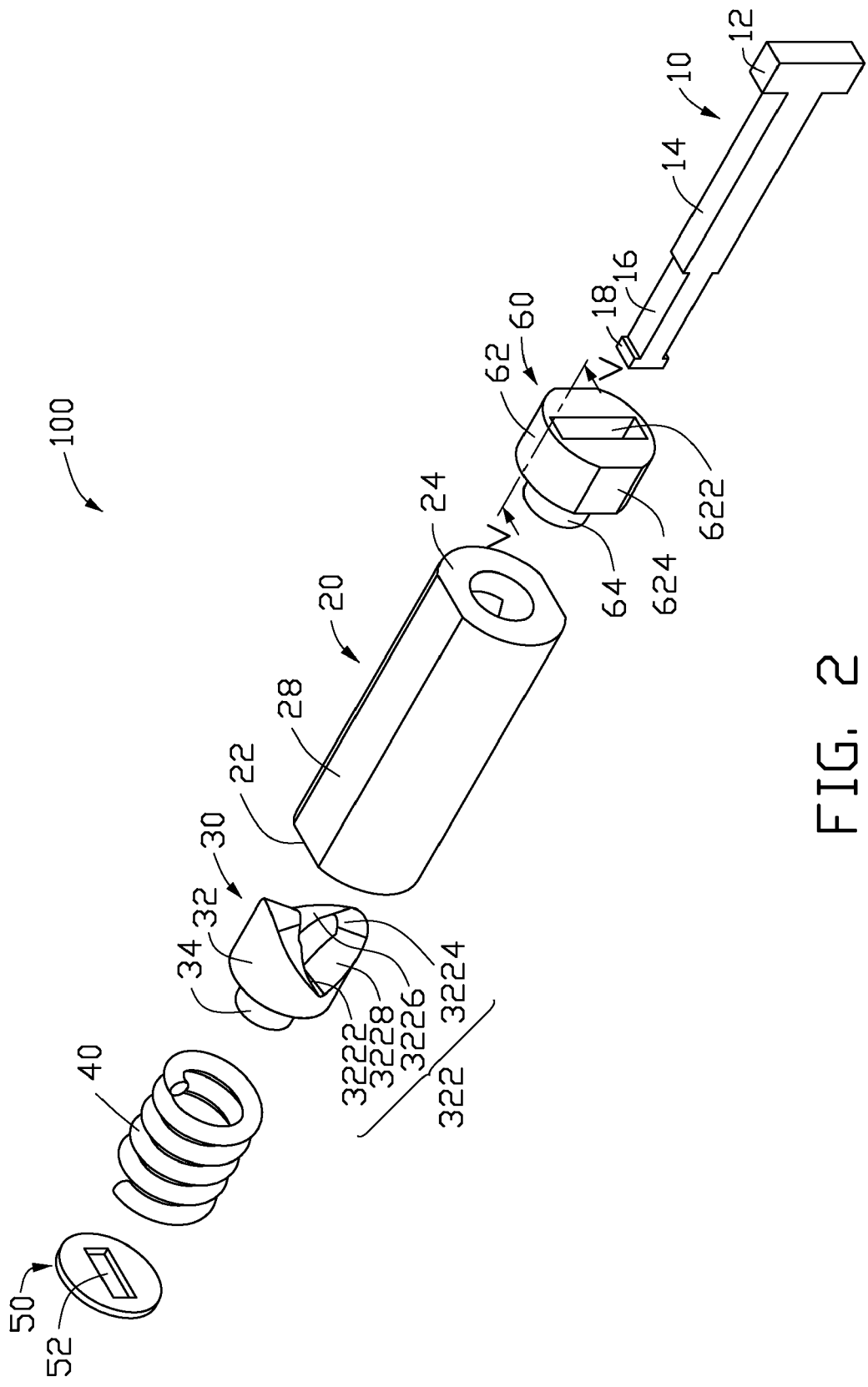
FIG. 2 is similar to FIG. 1, but viewed from another aspect.

Referring to FIGS. 1 and 2, a first exemplary hinge assembly 100 includes a main shaft 10, a sleeve 20, a follower 30, an elastic member 40, a washer 50 and a locking member 60.

The main shaft 10 includes coaxially mounted flange portion 12, shaft portion 14, necked portion 16 and positioning portion 18. A front side and a back side of the main shaft 10 are parallel. The flange portion 12 has a rectangular cross section, and is formed at one end of the main shaft 10. The shaft portion 14 is substantially long and narrow rectangular, and a cross-sectional area of the shaft portion 14 is smaller than the cross-sections of the flange portion 12. A cross-sectional area of the neck portion 16 is slightly smaller than the cross section of the shaft portion 14. The positioning portion 18 is formed at another end of the main shaft 10. A cross-sectional area of the positioning portion 18 is larger than the cross-sectional area of the necked portion 16.

Figure 3:
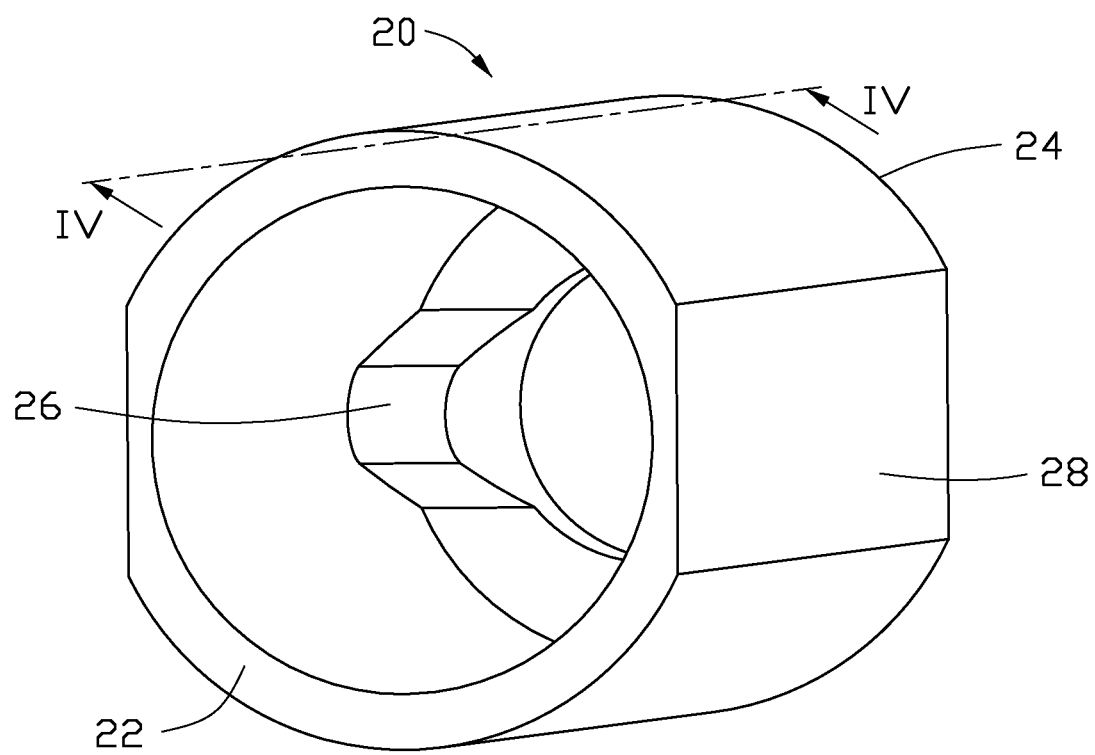
FIG. 3 is an isometric view of the sleeve shown in FIG. 1.
Figure 4:
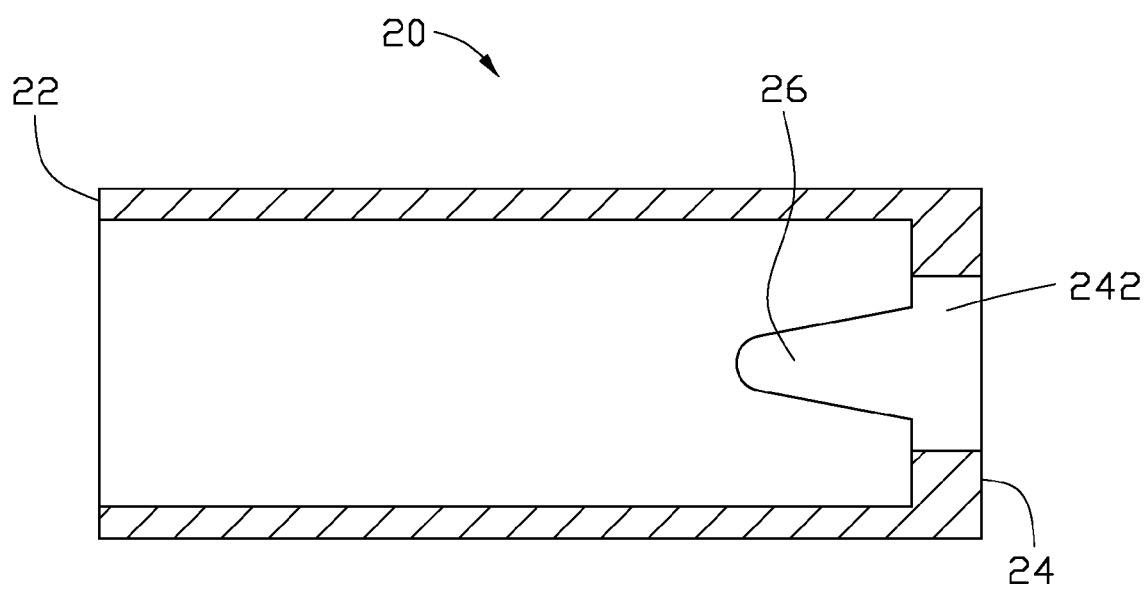
FIG. 4 is a cross-sectional view of FIG. 3 along IV-IV line.

Referring to FIGS. 3 and 4, the sleeve 20 includes an open end 22 and a partially-closed end 24. The partially-closed end 24 has an end wall (not labeled) and a central hole 242. Two spaced apart protrusions 26 extend from an inner side of the end wall toward the open end 22 of the sleeve 20 and are spaced apart from each other by an angle of about 180 degrees. Each protrusion 26 is substantially thumb-shape, and has a tip end. The protrusions 26 are integrally formed with the sleeve 20. The sleeve 20 forms two symmetric flat surfaces 28 along an outer peripheral wall thereof configured for fixing with a cover section.

The follower 30 includes a body 32 and a mounted portion 34. A diameter of the body 32 is larger than the diameter of the mounted portion 34, thereby forming a blocking wall 320 therebetween. The follower 30 defines a rectangular passage 36 for receiving the shaft portion 14. One end of the body 32 forms a cam surface 322 opposite to the mounted portion 34. The cam surface 322 includes two valleys 3222 and two peaks 3224. Each valley 322 and each peak 3224 is alternatively connected with a slow sloping surface 3226 and a rapid sloping surface 3228.

The elastic member 40 is preferably made of metal and is spiral-shaped (i.e. a coil spring). One end of the elastic member 40 resists the blocking wall 320 of the follower 30. A diameter of the elastic member 40 is slightly larger than a diameter of the shaft portion 14 and the necked portion 16 so the elastic member 40 can be placed around the main shaft 10.

The washer 50 is made of metal, and a diameter of the washer 50 is slightly smaller than an inner diameter of the open end 22 so the washer 50 may be received in the sleeve 20. The washer 50 defines a rectangular opening 52. A width of the opening 52 is equal to a height of the positioning portion 18. The positioning portion 18 may be inserted into the opening 52, and the washer 50 may rotate to avoid the washer 50 detaching from the main shaft 10.

Figure 5:
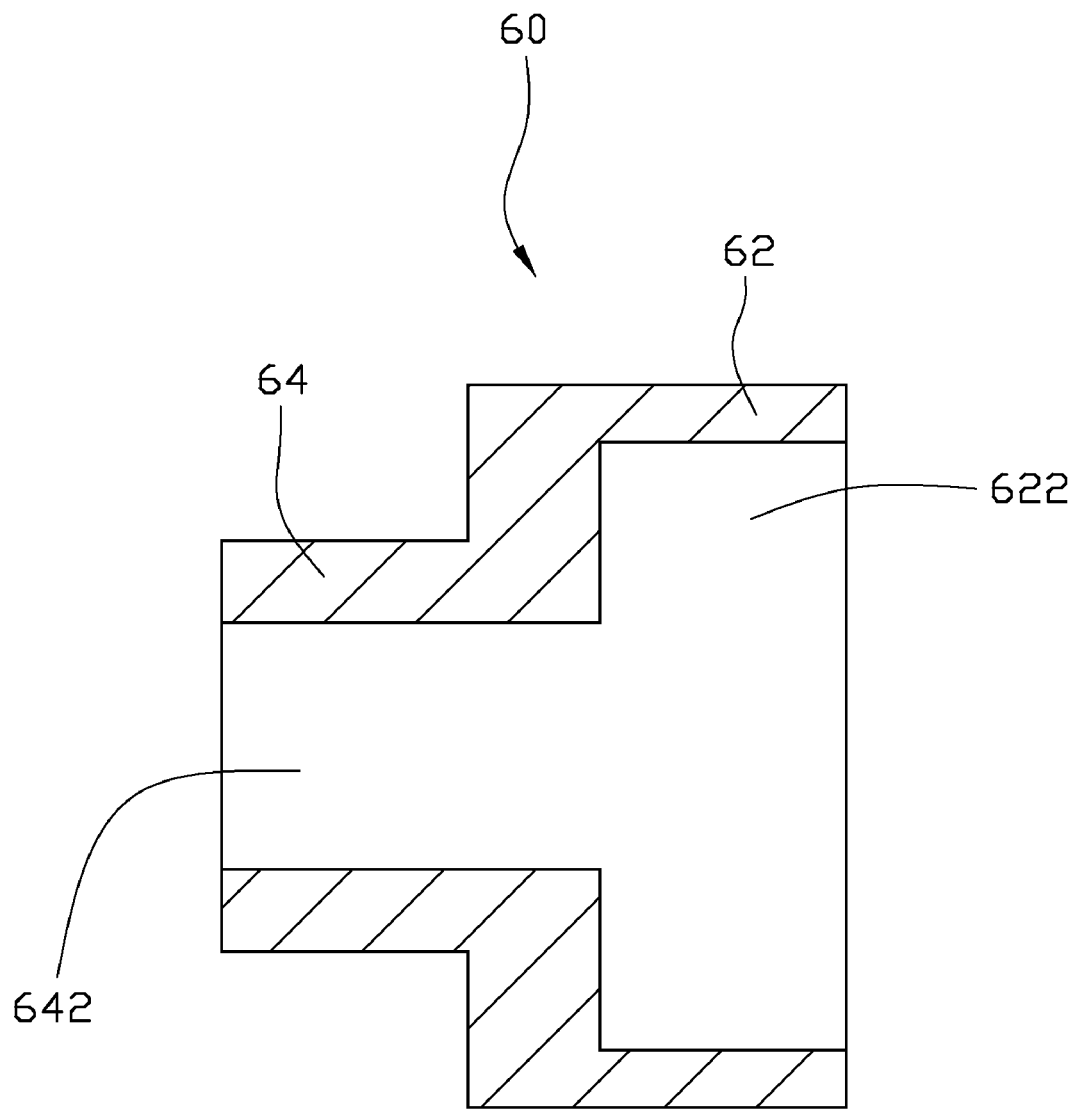
FIG. 5 is a cross-sectional view of the locking member along V-V line shown FIG. 2.
Figure 6:
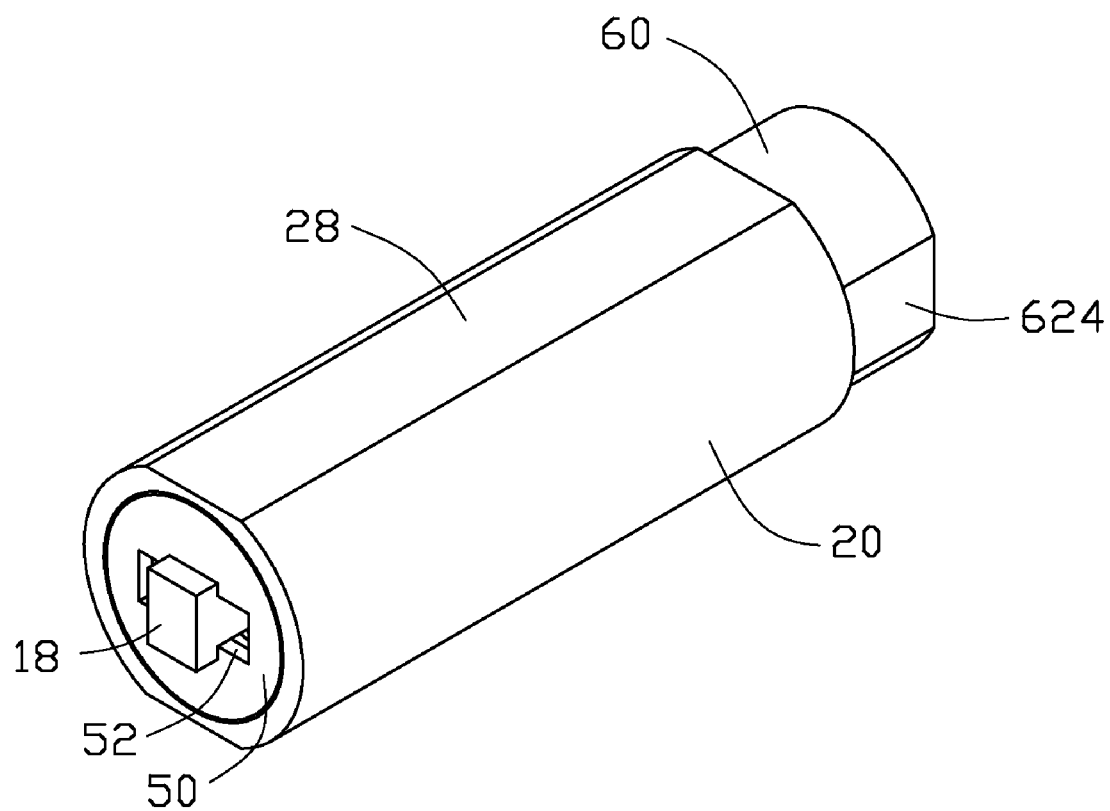
FIG. 6 is an assembled, isometric view of the exemplary hinge assembly shown in FIG. 1.
Figure 7:
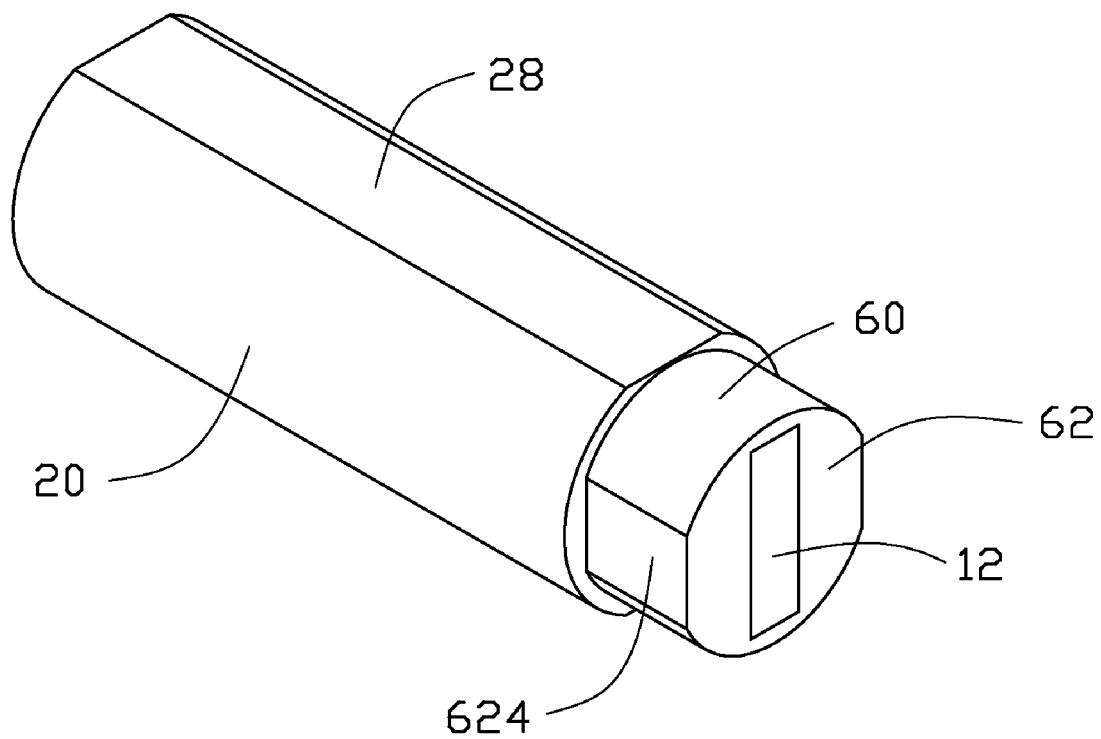
FIG. 7 is similar to FIG. 1, but viewed from another aspect.
Figure 8:
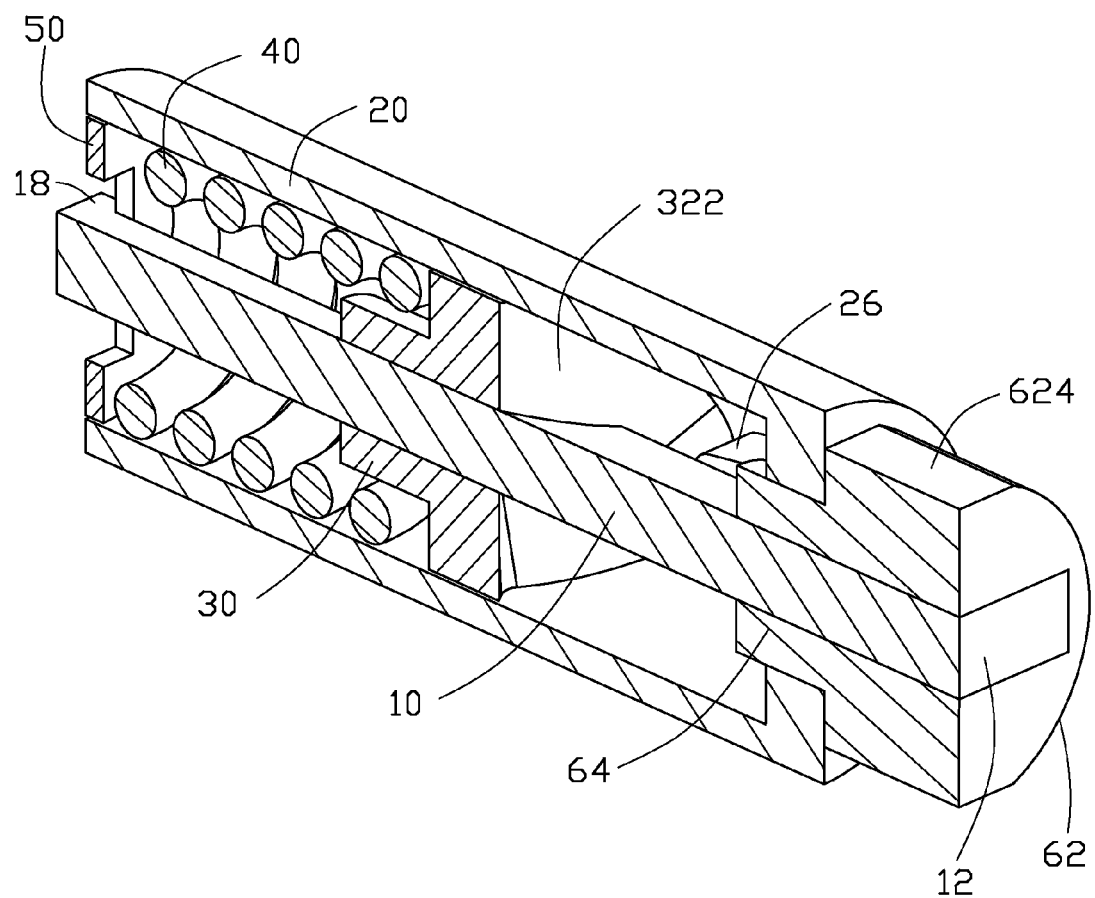
FIG. 8 is a cut-away view of FIG. 6.
Figure 9:
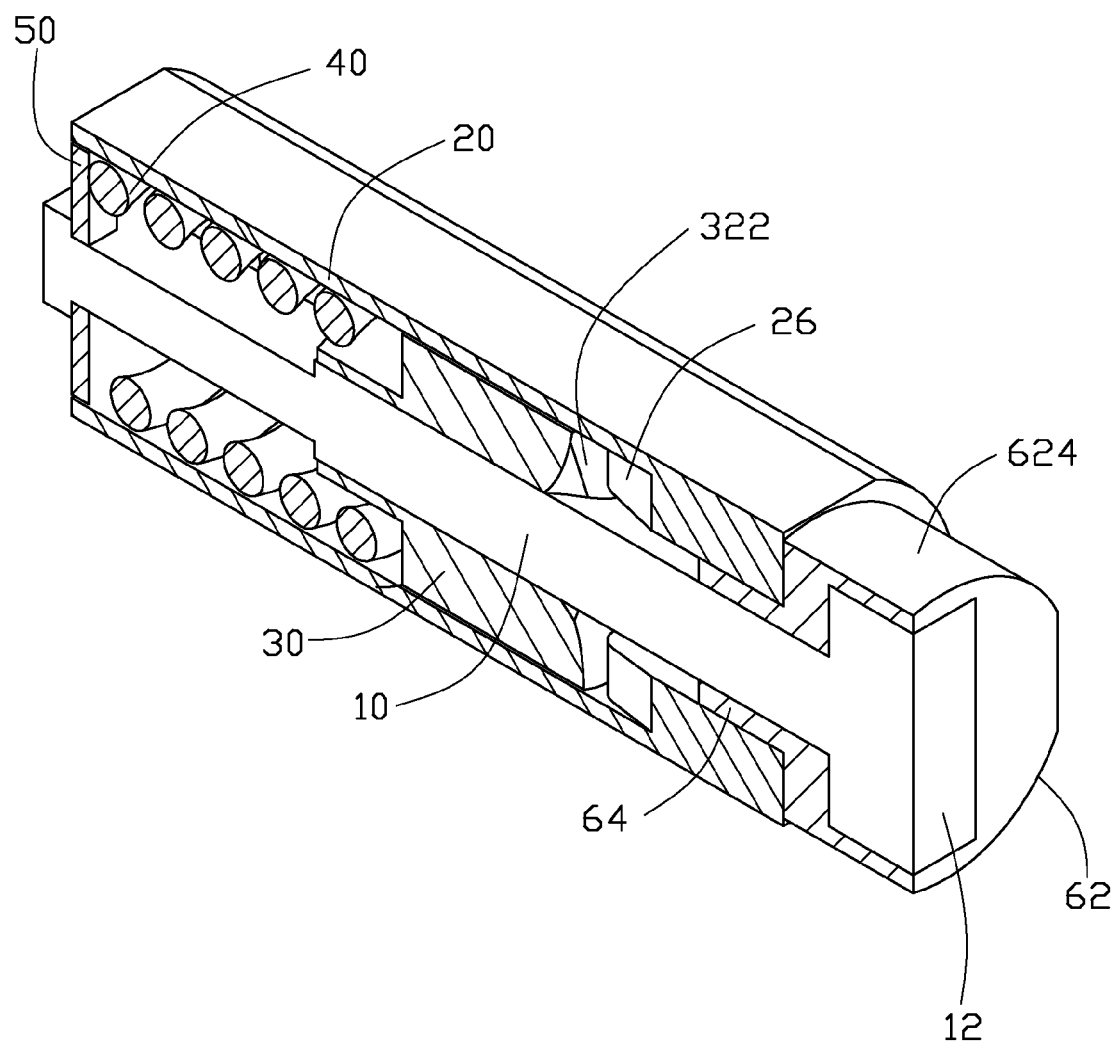
FIG. 9 is a cut-away view of FIG. 6 along another direction.

Referring to FIG. 5, the locking member 60 includes a fixing portion 62 and an extending portion 64 connected with the fixing portion 62. One end of the fixing portion 62 defines a reverse groove 622. The locking member 60 defines a through hole 642 communicating with the reverse groove 622. The fixing portion 62 forms two planar faces 624 configured for engaging with a body section.

Referring to FIGS. 6 to 9, during assembly of the hinge assembly 100, the main shaft 10 is firstly inserted through the locking member 60. Accordingly, the flange portion 12 is received in the reverse groove 622, and the shaft portion 14 is partially received in the through hole 642. Then, the main shaft 10 with the locking member 60 is inserted through the sleeve 20. The positioning portion 18 is exposed from the open end 22 of the sleeve 20. The extending portion 64 is engaged in the central hole 242 of the partially-closed end 24.

Next, the follower 30 is placed around the main shaft 10, and is further pushed into the sleeve 20 to bias the cam surface 322 engage with the protrusions 26. The elastic member 40 is placed around the main shaft 10, and one end of the elastic member 40 against the blocking surface 320. Finally, the washer 50 passes through the positioning portion 18 of the main shaft 10, and is rotated 90 degrees, thereby securing the above elements on the main shaft 10. The hinge assembly 100 is completely assembled.

The hinge assembly 100 is assembled in a foldable electronic device including a cover section and a body section. The flat surfaces 28 of the sleeve 20 are fixed to the cover section of the foldable electronic device. The planar faces 624 of the locking member 60 are fixed to the body section of the foldable electronic device. At an initial state, the protrusions 26 are engaged in the valleys 3222 of the follower 30. The elastic member 40 has a predetermined compressed force, and the cover is held in a closed position.

To open the foldable electronic device, the cover is manually rotated relative to the body in an opening direction. The sleeve 20 further moves together with the cover. Since the main shaft 10 limits the rotation of the follower 30, the protrusions 26 slide along the cam surface 322 and push the follower 30 to slide along the shaft portion 14. During this process, the elastic member 40 is further compressed, and the valleys 3222 are moved away from the protrusions 26. The tip end of the protrusion 26 slides along the slow sloping surface 3226 from the valley 3222 to the peak 3224. When the tip end of the protrusion 26 slides over the peak 3224, the cover is released. The follower 30 continues to slide in the open direction and move toward the positioning portion 18 of the shaft 10 with the assistance of the decompressed elastic member 40. The cover continues to open until the protrusions 26 move into another valley 3222 along the rap sloping surface 3228. Alternatively, the cover continues to open until the cover is resisted by the body to be at a stable state. At this time, the protrusions 26 may be at any location on the rapid sloping surface 3228. The close process of the foldable electronic device is vice versa, and herein is not detailed.

The protrusions 26 and the sleeve 20 are integrally formed together. This structure not only saves cost, it also simplifies the assembly process. In addition, the locking member 60 may cover the partially-closed end, and the open end of the sleeve 20 is blocked by the washer 50. When lubricate oil is coated between the cam surface 322 and the protrusions 26, the locked member 60 may prevent the oil from leaking out. Since the locking member 60 covers the partially-closed end of the sleeve 20, noise produced in the sleeve 20 may be reduced. At the same time, outside dusts are also prevented from entering into the sleeve 20.

Figure 10:
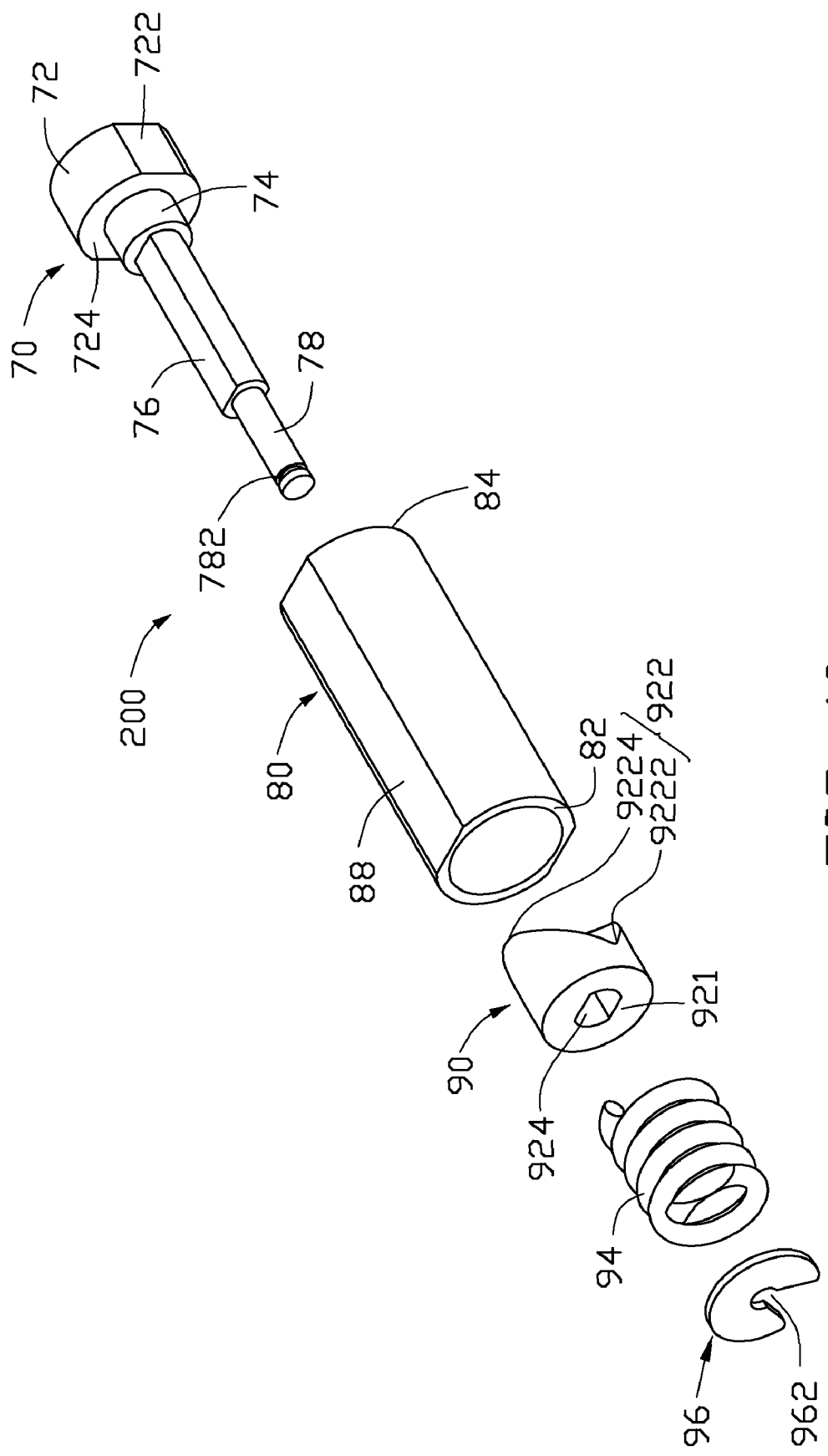
FIG. 10 is an exploded, isometric view of a second exemplary hinge assembly.

Referring to FIG. 10, a second exemplary hinge assembly 200 includes a main shaft 70, a sleeve 80, a follower 90, an elastic member 94, and a locked ring 96.

The main shaft 70 includes a flange portion 72, an inserted portion 74, a deformed portion 76, and a fixing portion 78 arranged with each other. The flange portion 72 is formed at one end of the main shaft 70. Two flat surfaces 722 are formed on the flange portion 72 and configured for engaging with a body section. The inserted portion 74 is substantially cylindrical, and a cross-sectional area of the inserted portion 74 is smaller than that of the flange portion 72, thereby forming a blocking wall 724 therebetween. The deformed portion 76 has a substantially ellipse cross section. The fixing portion 78 is formed at an opposite end of the main shaft 70, and defines a loop groove therein 782.

Figure 11:
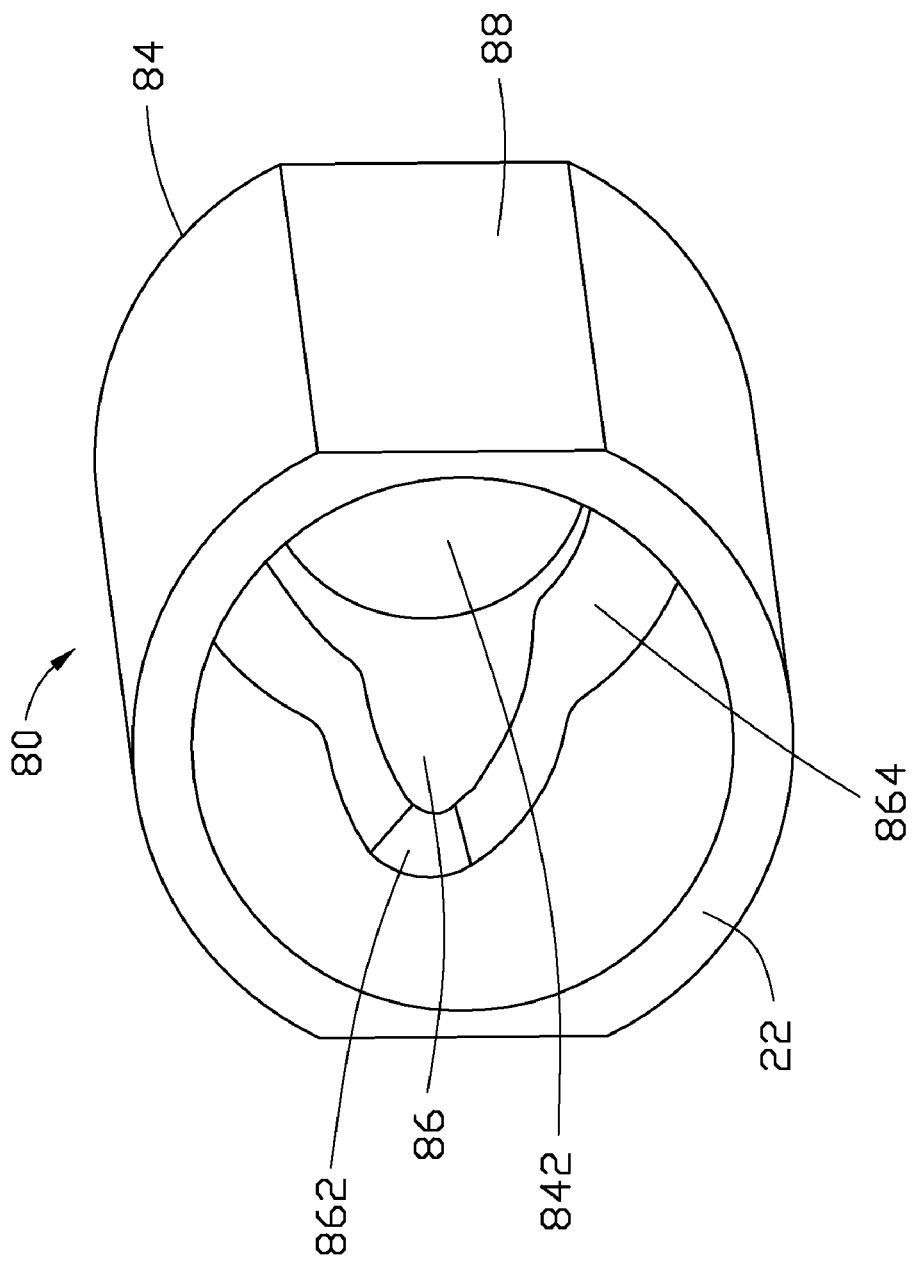
FIG. 11 is an isometric view of the sleeve shown in FIG. 10.

Referring to FIG. 11, the sleeve 80 includes an open end 82 and a partially-closed end 84. The partially-closed end 84 has an end wall and a central hole 842. A cam portion 86 of the sleeve 80 extends from an inner side of the end wall toward the open end 82 of the sleeve 80. The cam portion 86 includes two symmetric convex portions 862 and two symmetric concave portions 864. The cam portion 86 is integrally formed with the sleeve 80. The sleeve 80 forms two symmetric flat surfaces 88 along an outer peripheral wall thereof configured for fixing with a cover section.

The follower 90 is substantially cylindrical, and one end of the follower 90 has an end wall 921, and the other end thereof has a cam surface 922. The cam surface 922 includes two valleys 9222, and two peaks 9224 configured for engaging with the cam portion 86. The follower 90 defines a rectangular passage 924 for receiving the deformed portion 76.

The elastic member 94 is preferably made of metal and is spiral-shaped (i.e. a coil spring). One end of the elastic member 94 resists the end wall 921 of the follower 90. A diameter of the elastic member 94 is slightly larger than a diameter of the deformed portion 76 so the elastic member 94 can be placed around the main shaft 70.

The locked ring 96 is substantially C-shaped, and is made of elastic material. and a diameter of the locked ring 96 is slightly smaller than an inner diameter of the open end 82 so the locked ring 96 may be received in the sleeve 80. The locked ring 96 defines a through hole 962, and the locked ring 96 may be engaged in the loop groove 782 through the through hole 962.

Understandably, the cam portion and the protrusion as an engaging portion may be replaced with other configuration. In addition, the locking member may be integrally formed with the main shaft.

It is to be understood that the elastic member may alternatively be made of another material (e.g. plastic or rubber). The elastic member may alternatively have a different configuration, for example, a leaf spring or a resilient cylinder. It is believed that the present embodiments and their advantages will be understood from the foregoing description, and it will be apparent that different changes may be made thereto without departing from the spirit and scope of the invention or sacrificing all of its material advantages, the examples hereinbefore described merely being preferred or exemplary embodiments of the invention.

What is claimed is:

1. A hinge assembly, comprising:
    a sleeve including an open end and a partially closed end, an engaging portion integrally formed on a portion of the partially closed end inside the sleeve and facing toward the open end;
    a main shaft passing through the at least partially closed end of the sleeve;
    a follower having a cam surface, the follower being slidably placed around the main shaft and being received in the sleeve, the cam surface engaging with the engaging portion so that as the sleeve rotates about its longitudinal axis, the follower moves linearly along its longitudinal axis as the cam surface follows the engaging portion;
    a locking member defining a through hole, the locking member positioned outside of the sleeve and at least partially in contact with a surface of the partially closed end of the sleeve outside the sleeve, an end of the main shaft passing through the through hole in the locking member and extending towards the open end of the sleeve; and
    an elastic member contained within the sleeve and providing an elastic force to bias the cam surface against the engaging portion.

2. The hinge assembly as claimed in claim 1, wherein the engaging portion is two protrusions, and each protrusion is thumb-shape.

3. The hinge assembly as claimed in claim 1, further comprising a washer, wherein the washer is disposed at an opposite end of the main shaft, and locks the follower, and the elastic member in the sleeve, a diameter of the washer is smaller than an inner diameter of the open end, the washer is slidably received in the sleeve.

4. The hinge assembly as claimed in claim 1, wherein the main shaft includes a flange portion, a shaft portion, and a positioning portion coaxially arranged with each other, and the main shaft includes two opposites parallel sides.

5. The hinge assembly as claimed in claim 4, wherein a cross-sectional area of the shaft portion is smaller than the cross-sectional area of the flange portion, and a cross-sectional area of the positioning portion is larger than that of the shaft portion.

6. The hinge assembly as claimed in claim 1, the locking member includes a fixing portion and an extending portion connected each other, and one end of the fixing portion defines a groove partially communicating the fixing portion of the locking member.

7. The hinge assembly as claimed in claim 6, wherein the locking member defines a through hole communicating with the groove.

8. A foldable electronic device, comprising:
   a cover;
   a body; and
   a hinge assembly rotatably connecting the cover and the body, the hinge assembly comprising:
   a sleeve including an open end and a partially closed end, an engaging portion integrally formed on a portion of the partially closed end inside the sleeve and facing toward the open end, the sleeve engaging with one of the cover and the body;
   a main shaft passing through the at least partially closed end of the sleeve;
   a follower having a cam surface, the follower being slidably placed around the main shaft and being received in the sleeve, the cam surface engaging with the engaging portion so that as the sleeve rotates about its longitudinal axis, the follower moves linearly along its longitudinal axis as the cam surface follows the engaging portion;
   a locking member defining a through hole, the locking member positioned outside of the sleeve and at least partially in contact with a surface of the partially closed end of the sleeve outside the sleeve, an end of the main shaft passing through the through hole in the locking member and extending towards the open end of the sleeve; the locking member engaging with the other of the cover and the body; and
   an elastic member contained within the sleeve and providing an elastic force for biasing the cam surface against the engaging portion.

9. The foldable electronic device as claimed in claim 8, wherein the engaging portion is two protrusions, and each protrusion is thumb-shape.

10. The foldable electronic device as claimed in claim 8, further comprising a washer, wherein the washer is disposed at an opposite end of the main shaft, and locks the follower, the elastic member in the sleeve, a diameter of the washer is smaller than an inner diameter of the open end, the washer is slidably received in the sleeve.

\* \* \* \* \*